Oct. 4, 1938.    F. G. GALPIN    2,131,872
MULCHER LIFTER
Filed July 26, 1937    2 Sheets-Sheet 1

FRED G. GALPIN
INVENTOR.

BY [signature]
ATTORNEYS.

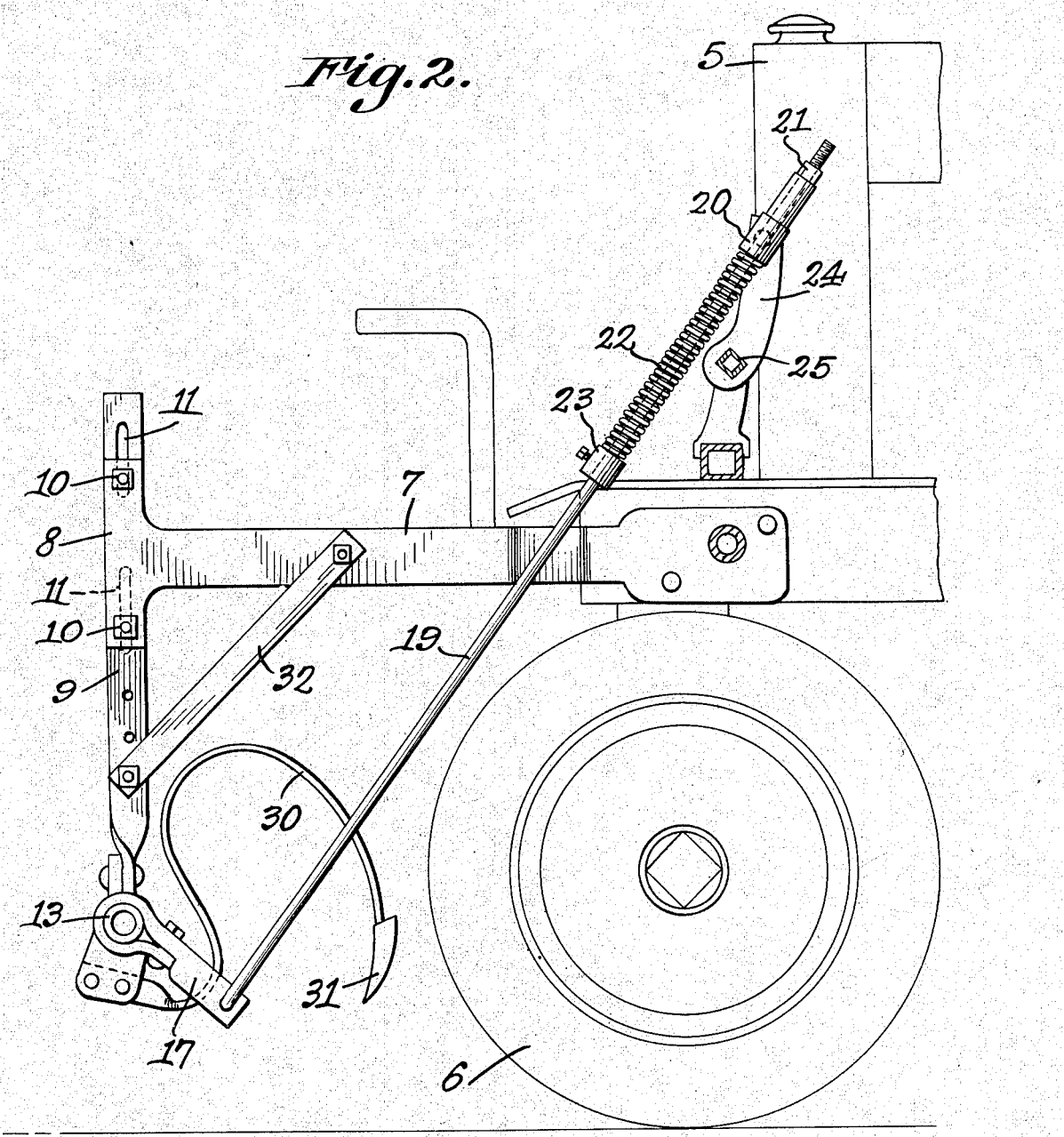

Patented Oct. 4, 1938

2,131,872

UNITED STATES PATENT OFFICE 2,131,872

MULCHER LIFTER

Fred G. Galpin, Williamsfield, Ill.

Application July 26, 1937, Serial No. 155,820

1 Claim. (Cl. 97—47)

This invention relates to an attachment for use in connection with farm tractors, the primary object of the invention being to provide a device adapted for attachment to the front end of a tractor to be used as a mulch lifter, or to smooth the ground directly in advance of the front wheels of the tractor, eliminating vertical movement of the tractor, caused by the tractor moving over a ridge or furrowed field.

An important object of the invention is to provide a device of this character which may be readily and easily bolted to the usual tractor frame, the device having means whereby the disks, sweeps or shovels thereof, may be adjusted vertically, to meet the requirements of use.

With the foregoing and other objects in view, which will appear as the description proceeds, the invention resides in the combination and arrangement of parts and in the details of construction hereinafter described and claimed, it being understood that changes in the precise embodiment of the invention herein described may be made within the scope of what is claimed, without departing from the spirit of the invention.

Referring to the drawings:

Figure 2 is a fragmental side elevational view thereof, the shovels thereof having been moved to their inactive positions.

Figure 1:
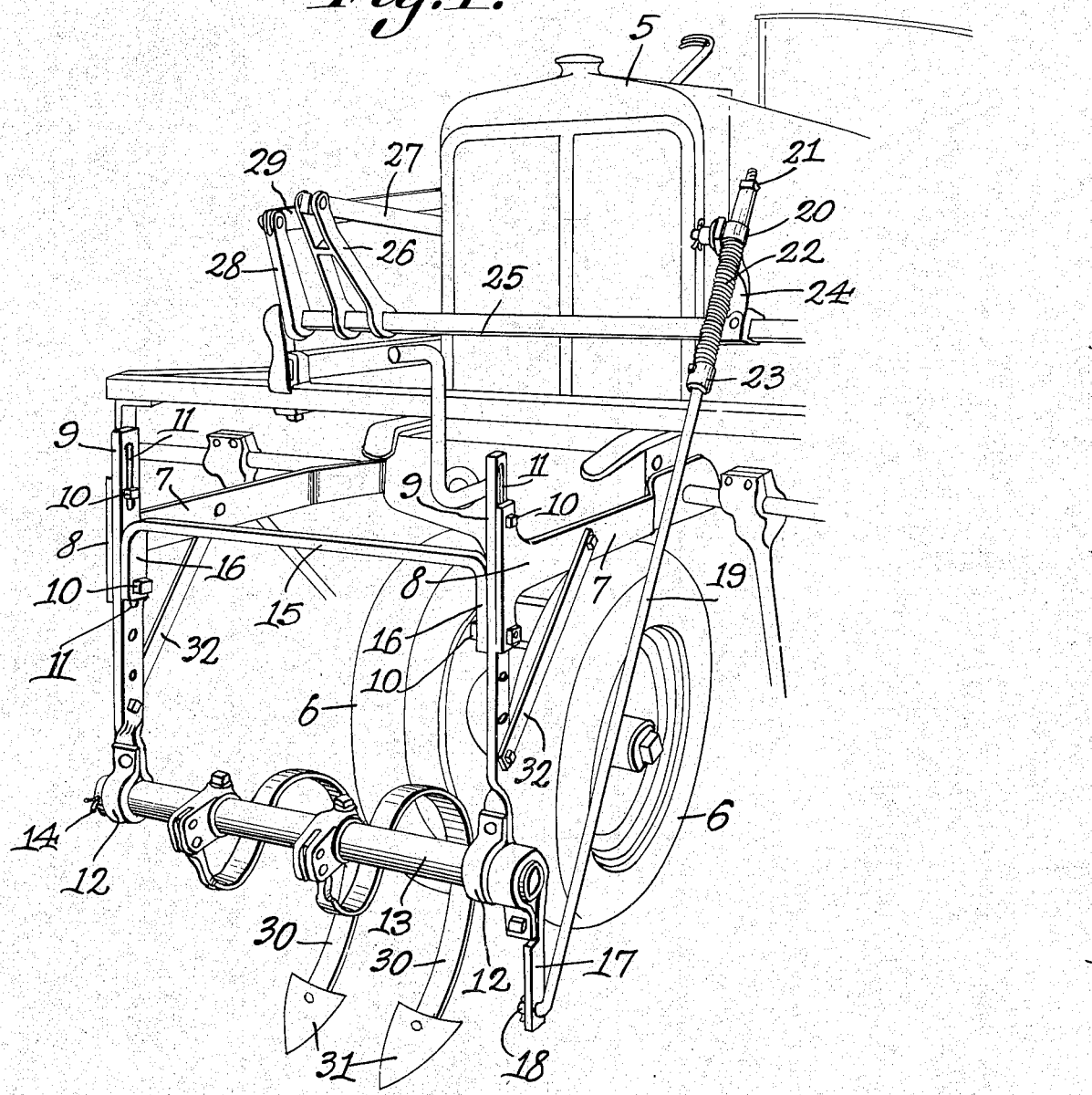
Figure 1 is a fragmental elevational view illustrating a tractor equipped with a device constructed in accordance with the invention.

Referring to the drawings in detail, the reference character 5 designates the usual farm tractor having wheels 6, supporting the front end of the tractor. The attachment comprises a frame including the supporting bars 7, which are secured to the side rails of the tractor chassis, as clearly shown by Figure 2 of the drawings. These bars 7 are formed with T-shaped ends or heads 8 which are secured to the bars 9, by means of the bolts 10 that pass through openings in the heads 8 and extend through elongated openings 11, formed in the bars 9.

At the lower ends of the bars 9 are bearings 12 in which the ends of the shaft 13 are mounted, there being provided a cotter key 14 at one end of the shaft for holding the shaft 13 against movement through the bearings in one direction.

The reference character 15 designates a brace bar that extends between the bars 9, the brace bar having downwardly extended end portions 16 that are bolted to the bars 9, by means of the bolts 10.

Secured to the shaft 13, at one end thereof, is an arm 17, which is formed with an opening through which the right angled end 18 of the rod 19 extends, so that the rod 19 is pivotally connected with the arm 17.

The upper end of the rod 19 extends through a pivoted eye member 20, and is held within the pivoted eye member, by means of the nut 21 positioned on the threaded end of the rod 19. The reference character 22 designates a coiled spring that engages the pivoted eye member 20, the opposite end of the coiled spring contacting with the adjustable collar 23, mounted on the rod 19. Thus it will be seen that due to this construction, the tension of the spring 22 may be adjusted, to meet various requirements.

The pivoted eye member 20 is carried at one end of the arm 24 which in turn is secured to the shaft 25 to move therewith, the shaft 25 being supported in suitable bearings. The shaft 25 constitutes the actuating arm for actuating the rod 19, and as shown, this shaft 25 is supplied with arm 26 to which the bar 27 is connected, the bar 27 being operated by the usual power mechanism, not shown. An arm indicated by the reference character 28 is secured to one end of the shaft 25, and this arm has connection with the bar 29 that extends towards the rear of the tractor, and has connection with a lever not shown, whereby the shaft 25 may be manually operated.

Carried by the shaft 13 are spring arms 30 on which the blades 31 are mounted, the arms being so arranged that the blades thereof operate directly in front of the wheels 6, to smooth irregularities in the surface over which the tractor is moving, in advance of the wheels, thereby eliminating vertical movement of the tractor, due to the wheels thereof passing over furrows or other irregularities.

When it is desired to move the shaft to throw the blades from their active position as shown by Figure 1 of the drawings, to their inactive positions as shown by Figure 2, it is only necessary to operate the shaft 25 to rotate the shaft 13, moving the shaft in the desired direction.

Brace bars indicated by the reference character 32 are provided, and hold the bars 9 against rearward movement, under the action of the blades 31 digging into the ground surface.

Should it be desired to raise or lower the shaft 13 to change the depth of operation of the blades 31, it is only necessary to loosen the bolts 10, and move the bars 9 vertically. The bolts will then be tightened and the bars 9 securely held in their positions of adjustment.

While the blades have been described as a means for leveling the surface in advance of the wheels of a tractor, it is to be understood that these blades may be used as a means for lifting mulch.

Having thus described the invention, what is claimed is:

An attachment for farm tractors, comprising a frame, means for mounting the frame on a tractor for vertical adjustment, said frame including side bars, bearings at the lower ends of the side bars, a horizontal shaft mounted within the bearings, spring arms carrying blades, mounted on the shaft, an arm secured to one end of the shaft, a rod connected to the free end of the arm, an operating shaft, an arm having an eye member, secured to the operating shaft, said rod extending through the eye member, a collar on the rod, a spring on the rod, one end of the spring engaging the collar, the opposite end of the spring contacting with one edge of the eye member, cushioning the movements of the rod, and means for operating the operating shaft to raise and lower said spring arms and blades.

FRED G. GALPIN.